United States Patent [19]
Masauji

[11] Patent Number: 5,582,021
[45] Date of Patent: Dec. 10, 1996

[54] AIR-CONDITIONING CONTROL METHOD FOR A VEHICLE

[75] Inventor: Mamoru Masauji, Saitama-ken, Japan

[73] Assignee: Zexel Corporation, Tokyo, Japan

[21] Appl. No.: 502,626

[22] Filed: Jul. 14, 1995

[30] Foreign Application Priority Data

Jul. 25, 1994 [JP] Japan ................................. 6-172461

[51] Int. Cl.$^6$ ....................................................... B60H 1/00
[52] U.S. Cl. ............................. 62/126; 62/208; 236/91 R
[58] Field of Search ............................ 62/208, 209, 203, 62/204, 210, 229, 126, 127, 129, 160, 244, 180; 364/150, 151, 557, 551.01; 236/91 R, 91 C, 91 D, 91 E, 91 F, 91 G, 94; 165/12, 11.1, 27, 28, 26

[56] References Cited

U.S. PATENT DOCUMENTS

| | | | |
|---|---|---|---|
| 4,432,210 | 2/1984 | Saito | ........................................ 62/126 |
| 4,696,167 | 9/1987 | Matsui et al. | .......................... 62/244 X |
| 4,744,511 | 5/1988 | Kakehi et al. | ....................... 364/151 X |
| 5,115,643 | 5/1992 | Hayata et al. | ......................... 62/126 X |

Primary Examiner—Harry B. Tanner
Attorney, Agent, or Firm—Wolf, Greenfield & Sacks, P.C.

[57] ABSTRACT

An air-conditioning control method for a vehicle which can continue smoothly control close to ordinary automatic control before failure even when a specific detection sensor goes wrong. When one of the plurality of detection sensors malfunctions, the size of an environmental factor corresponding to the malfunctioning detection sensor is calculated from a heat balance calculation model for various environmental factors. A correction term for the processing of a low-pass filter is added to this estimated value to obtain a highly accurate estimated value. When control of the air-conditioner is continued based on this highly accurate estimated value and output values of the normal detection sensors, the same control status as that of control of the air-conditioner before malfunctioning can be obtained even during shift from the output of the detection sensor to the estimated value.

8 Claims, 12 Drawing Sheets

AIR-CONDITIONING CONTROL METHOD FOR A VEHICLE

BACKGROUND OF THE INVENTION

1. Field of the Invention

This invention relates to an air-conditioning control method for controlling the air-conditioning of the inside of a vehicle such as a passenger car, which can continue control of air-conditioning making use of outputs from other normal detection sensors without using a specific detection sensor.

2. Description of the Prior Art

For automatic control of the air-conditioning of the inside of a vehicle, output signals from detection sensors for detecting various environmental factors, such as an output signal from an inside temperature detection sensor, an output signal from an outside temperature detection sensor, a detection signal from an outlet temperature detection sensor of an air-conditioner, an output signal from a direct solar radiation sensor for detecting a heating value of solar radiation and an output signal from a car body temperature detection sensor, are important data for controlling the air-conditioner. When a certain detection sensor goes wrong, the size of an environmental factor corresponding to the malfunctioning detection sensor is calculated from a heat balance calculation model for each environmental factor to obtain an estimated value.

If control of the air-conditioner is continued based on this estimated value and output values from the other normal detection sensors, the sac status of control as that of air-conditioning control before the failure can be obtained even during the period until the malfunctioning detection sensor is fixed. This prior art is disclosed in JP-A-5-116522 and JP-A-5-50836 (the term "JP-A" used herein means "unexamined published patent application"). However, JP-A-5-50836 has the defect that a car body temperature can be estimated but an outside temperature cannot be estimated.

Further, JP-A-5-116522 teaches that the difference between a preset target inside temperature and an inside temperature obtained from an inside temperature detection sensor is integrated by a time to obtain a correction value for an outside temperature. This correction value is added to the estimated outside temperature to approximate the estimated outside temperature to a more accurate outside temperature. However, even this method still cannot theoretically guarantee convergence into a correct outside temperature.

However, there is a limit to types of detection sensors whose output values can be estimated. Since an estimated output value from a malfunctioning detection sensor is not a highly accurate estimated value, there is a fear that control of the air-conditioner may be deviated from normal control and there is the possibility that passengers are forced to be in an unpleasant car environment.

SUMMARY OF THE INVENTION

In the present invention, one or two environmental factors are estimated without using sensors for detecting environmental factors (air sensor and solar radiation sensor). It is therefore an object of the invention to provide an air-conditioning control method for a vehicle, which can continue a good control status by calculating a highly accurate estimated value without an air sensor and a solar radiation sensor.

Therefore, the subject matter of the present invention is that, in an air-conditioner for use in a vehicle which is equipped with a control unit for receiving detected values or estimated values pertaining to a heating value supplied from the air-conditioner to the inside of the vehicle and detected values or estimated values pertaining to various environmental factors affecting the heating value of the inside of the vehicle other than those of the air-conditioner and for estimating an inside temperature using a heat balance calculation model which uses the detection values and estimated value as parameters and with a detection sensor for detecting an inside temperature temperature, and which constitutes an observer by multiplying the difference between the estimated value obtained from the calculation model and the detected value from the detection sensor by a predetermined gain so as to feedback the obtained value, an air-conditioning control method is characterized in that a correction term is created based on the feedback value to correct the detected values or estimated values used as parameters.

In this instance, an environmental factor which is not used as an input is an outside temperature which is calculated from a heat balance calculation model based on a heat balance calculation expression for an environmental factor contributing to variations in inside temperature and a heat balance calculation expression for an environmental factor contributing to variations in car body temperature.

The estimated outside temperature is obtained from a low-pass filter as an estimated value.

An environmental factor which is not used as an input is an amount of solar radiation which is calculated from a heat balance calculation model based on a heat balance calculation expression for an environmental factor contributing to variations in inside temperature and a heat balance calculation expression for an environmental factor contributing to variations in car body temperature.

The estimated value is an amount of solar radiation and the correction term uses as a parameter the difference between an output value from an inside temperature detection sensor for detecting a temperature inside the vehicle and an estimated value of inside temperature.

The correction term for the amount of solar radiation uses as a parameter an output value from a detection sensor which is used as an input in the former stage of a change in inside temperature.

The estimated value is an outside temperature and the correction term uses as a parameter the difference between an output value from the inside temperature detection sensor which is used as an input for detecting an inside temperature and an estimated value of inside temperature.

The estimated value is an outside temperature and the correction term can be obtained by using an amount of solar radiation which is an output value detected by the detection sensor in the former stage of a change in inside temperature, the difference between an output value detected by the inside temperature detection sensor in the former stage of a change in inside temperature and an estimated value of inside temperature, and the difference between an output value detected by the inside temperature detection sensor in the latter stage and the estimated value of inside temperature.

Therefore, when a detection sensor for detecting an outside temperature or an amount of solar radiation is not used as an input, the size of an environmental factor corresponding to the detection sensor is estimated based on a heat balance calculation model so that control of an air-conditioner is continued based on this estimated value and output values from other detection sensors used as inputs. Since a stable estimated value can be obtained, smooth air-conditioning control can be realized. Since the estimated size of an environmental factor is highly accurate, smooth air-conditioning control that provides an effective temperature is made possible when any type of detection sensor is not used as an input. As a consequence, even if detection sensors other than required and sufficient are omitted, highly accurate operation of the air-conditioner is possible.

The other objects, features and advantages of the invention will become more apparent from the following description when taken in conjunction with the accompanying drawings.

DESCRIPTION OF THE PREFERRED EMBODIMENT

A first aspect of the present invention is described hereinunder with reference to FIG. 1 to FIG. 5.

Figure 1:
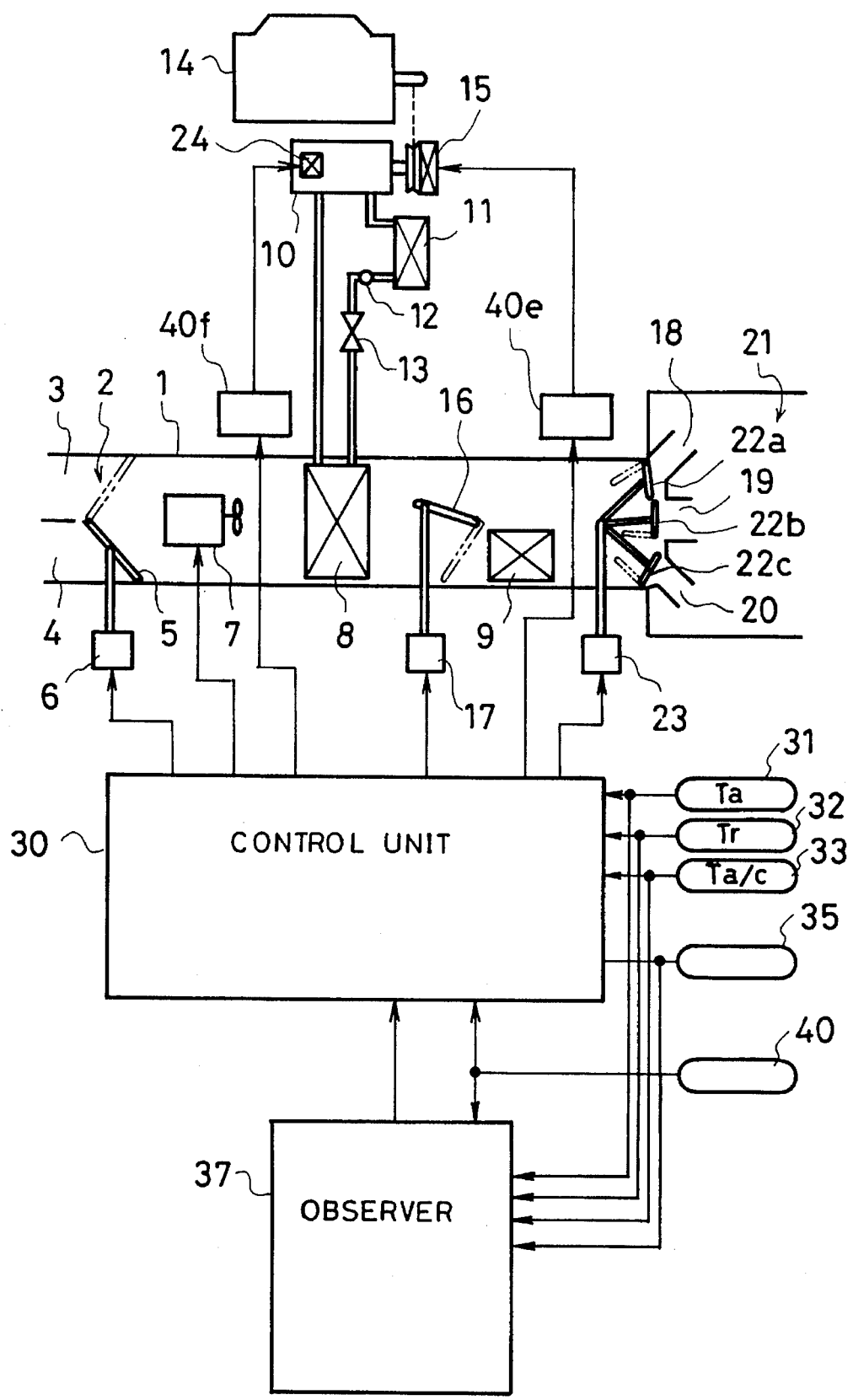
FIG. 1 is a schematic diagram of the configuration of the present invention.

In FIG. 1, an embodiment of this air-conditioning control method for a vehicle is structured such that an intake switch unit 2 is provided on the uppermost stream side of an air-conditioning duct 1 and equipped with an inside and outside air switching door 5 at a position where the air-conditioning duct is divided into all inside air inlet 3 and an outside air inlet 4. The inside and outside air switching door 5 is operated by an actuator 6 to select inside or outside air to be introduced into the air-conditioning duct 1 so as to achieve a desired inlet mode.

An air blower 7 is intended to draw air into the air-conditioning duct 1 and blow the air toward a down stream side and is provided with an evaporator 8 and a heater core 9 at its rear. The evaporator 8 is connected to a compressor, condenser 11, liquid tank 12 and expansion valve 13 by piping to constitute a cooling cycle. Power from an engine 14 is transmitted to the compressor 10 through an electromagnetic clutch 15 which is turned on and off to activate and stop the compressor 10. The compressor 10 is such that the discharge capacity of a refrigerant is externally controlled by a capacity variable unit 24.

An air mix door 16 is provided in front of the heater core 9 and the opening of the air mix door 16 is controlled by the actuator 17 to change the amount of air passing through the heater core 9 and the amount of air bypassing the heater core 9 with the result that the temperature of outlet air is controlled.

The most downstream side of the air-conditioning duct 1 is divided into a defrost air outlet 18, vent air outlet 19 and floor air outlet 20 in the inside of the vehicle. Mode doors 22a, 22b and 22c are provided at respective outlets and operated by the actuator 23 to obtain a desired outlet mode.

The actuators 6, 17 and 23 and the motor of the air blower 7 are controlled based on an output signal from a control unit 30. The electromagnetic clutch 15 of the compressor 10 is controlled by a clutch control circuit 40e and the capacity variable unit 24 is controlled by a capacity variable control circuit 40f based on an output signal from the control unit 30.

The control unit 30 is a known one which comprises a drive circuit for driving and controlling doors and an air blower, a microcomputer for controlling this drive circuit and an input circuit for inputting signals into this microcomputer. The microcomputer includes a central processing unit (CPU), a red-only memory (ROM), a random-access memory (RAM), etc. Into the input circuit of the control unit are input output signals from an outside temperature detection sensor 31 for detecting an outside temperature Ta, an inside temperature detection sensor 32 for detecting a temperature of the inside of a vehicle Tr, an outlet temperature detection sensor 33 for detecting an outlet temperature Ta/c of an air-conditioner, a direct solar radiation sensor 35 for detecting a heating value of solar radiation directly to the inside of the vehicle through window glass, and the like.

Figure 2:
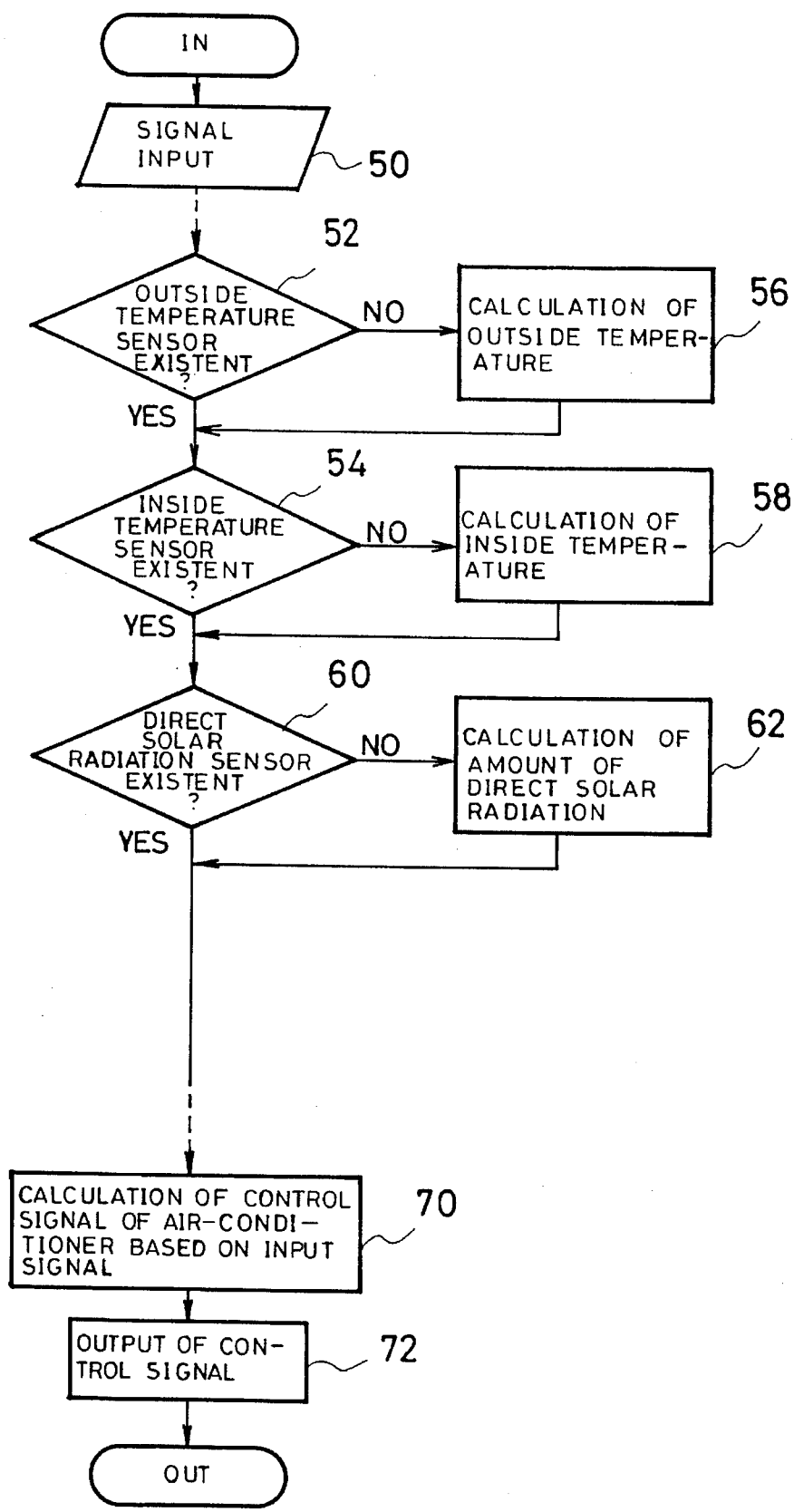
FIG. 2 is a flow chart showing an example of processing when specific sensors are used as inputs into a microcomputer.

FIG. 2 shows processing in the case that a specific detection sensor is not used (provided) as an input for control by the above control unit 30. The control unit 30 receives signals from detection sensors for detecting various environmental factors in step 50 (such as the outside temperature detection sensor 31, inside temperature detection sensor 32, outlet temperature detection sensor 33 and direct solar radiation sensor 35).

In steps 52 and 54, it is determined whether or not a specific sensor is used (existent) as an input. A detailed description of the determination of the existence and non-existence of a detection sensor is omitted. When it is determined that the outside temperature detection sensor 31 is non-existent (not used), an outside temperature is estimated in step 56, and when it is determined that the inside temperature detection sensor 32 is non-existent (not used), an inside temperature is estimated in step 58. In step 60, when it is determined that the direct solar radiation sensor 35 is non-existent (not used), an amount of direct solar radiation is estimated in step 62.

If these detection sensors are used as inputs, a control signal for controlling air-conditioner elements is calculated using directly the output values of the detection sensors. However, if a specific detection sensor, for example, the outside temperature detection sensor 31, is not used as an input, an outside temperature estimated in step 56 is used to calculate a control signal for controlling the air-conditioner elements, and if the inside temperature detection sensor 32 is not used as an input, an inside temperature estimated in step 58 is used to calculate the control signal (step 70). In the subsequent step 72, the control signal calculated in the above step is output to the air-conditioner elements.

Figure 3:
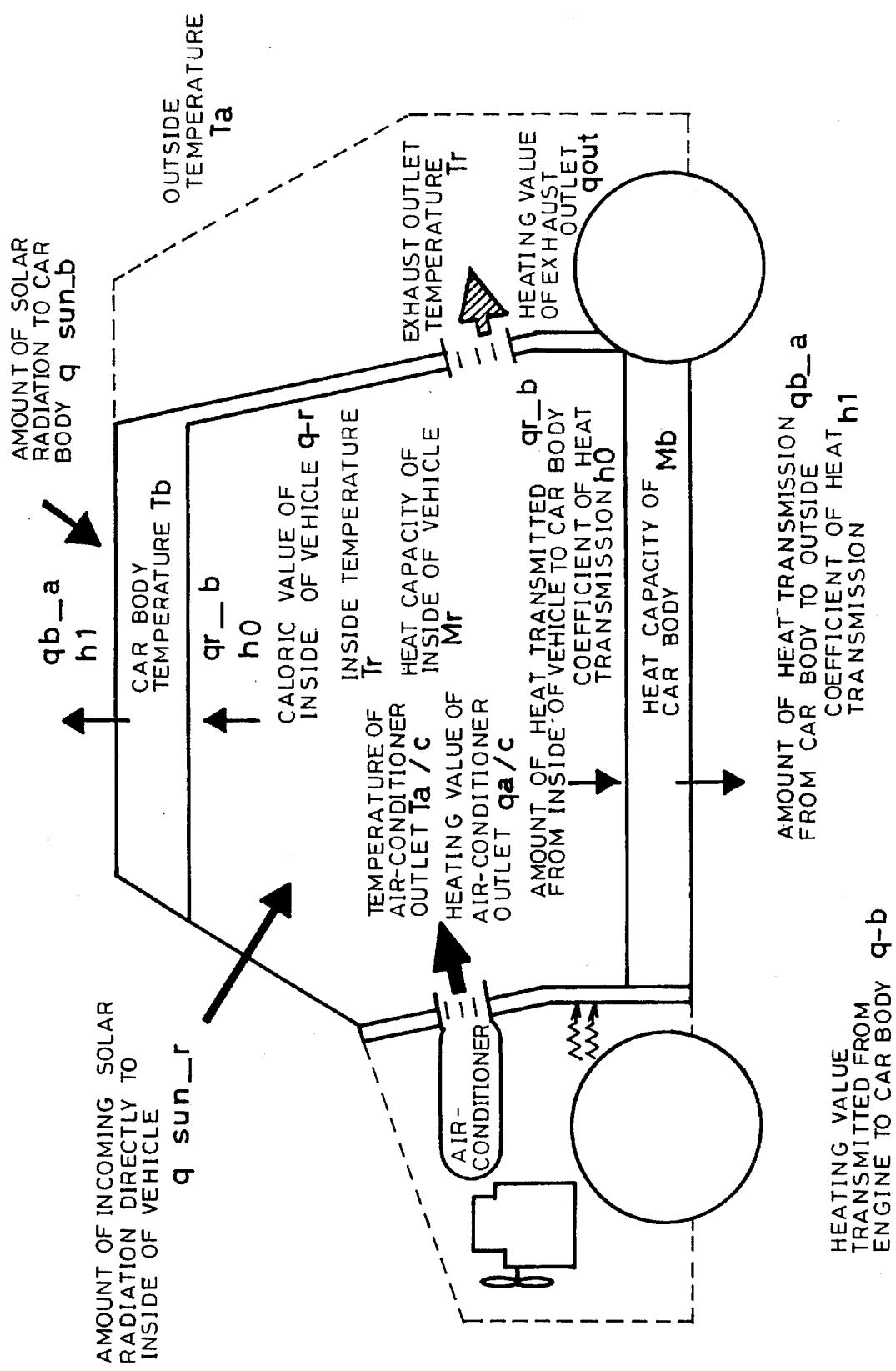
FIG. 3 is a diagram showing the heat balance of a vehicle.

Processing for calculating an outside temperature shown in step 56 is described in detail below. As shown in FIG. 3, heat balance seen from the inside of the vehicle is represented by the following expressions 1 and 2:

$$Mr \frac{dTr}{dt} = \alpha(To - Tr) - \beta(Tr - Tb) + Qs - 1 \quad \text{[expression 1]}$$

$$Mb \frac{dTb}{dt} = \beta(Tr - Tb) - \delta(Tb - Ta) + Qs - 2 \quad \text{[expression 2]}$$

wherein Tb is a car body temperature, Ta an outside temperature, Mb a heat capacity of a car body, β a heat conductivity of the car body, δ a heat conductivity of the car body, Q2 an amount of solar radiation to the car body, Tr a temperature of the inside of the vehicle, Mr a heat capacity of the inside of the vehicle, α an amount of air blown out of the air-conditioner, qout a heating value of air exhausted from the inside to the outside of the vehicle, qr–b a heating value transmitted from the inside of the vehicle to the car body, and Q1 a heating value of solar radiation directly to the inside of the vehicle through the window glass (Q1 is defined as Qs–1 and Q2 is defined as Qs–2).

When the basic expressions 1 and 2 are converted by matrix representation, the following expression 3 like a structural diagram can be obtained.

$$\begin{bmatrix} Tr \\ Tb \end{bmatrix} = \begin{bmatrix} -\frac{\alpha+\beta}{Mr} & \frac{\beta}{Mr} \\ \frac{\beta}{Mb} & -\frac{\beta+\delta}{Mb} \end{bmatrix} \begin{bmatrix} Tr \\ Tb \end{bmatrix} + \quad \text{[expression 3]}$$

$$\begin{bmatrix} \frac{\alpha}{Mr} & 0 & \frac{1}{MR} & 0 \\ 0 & \frac{\delta}{Mb} & 0 & \frac{1}{Mb} \end{bmatrix} \begin{bmatrix} To \\ Ta \\ Qs-1 \\ Qs-2 \end{bmatrix}$$

wherein $$A = \begin{bmatrix} -\frac{\alpha+\beta}{Mr} & \frac{\beta}{Mr} \\ \frac{\beta}{Mb} & -\frac{\beta+\delta}{Mb} \end{bmatrix}$$

$$B = \begin{bmatrix} \frac{\alpha}{Mr} & 0 & \frac{1}{Mr} & 0 \\ 0 & \frac{\delta}{Mb} & 0 & \frac{1}{Mb} \end{bmatrix}$$

$$X = \begin{bmatrix} Tr \\ Tb \end{bmatrix}$$

When only an inside temperature is detected, y=CX, C=[1 0].

Figure 4:
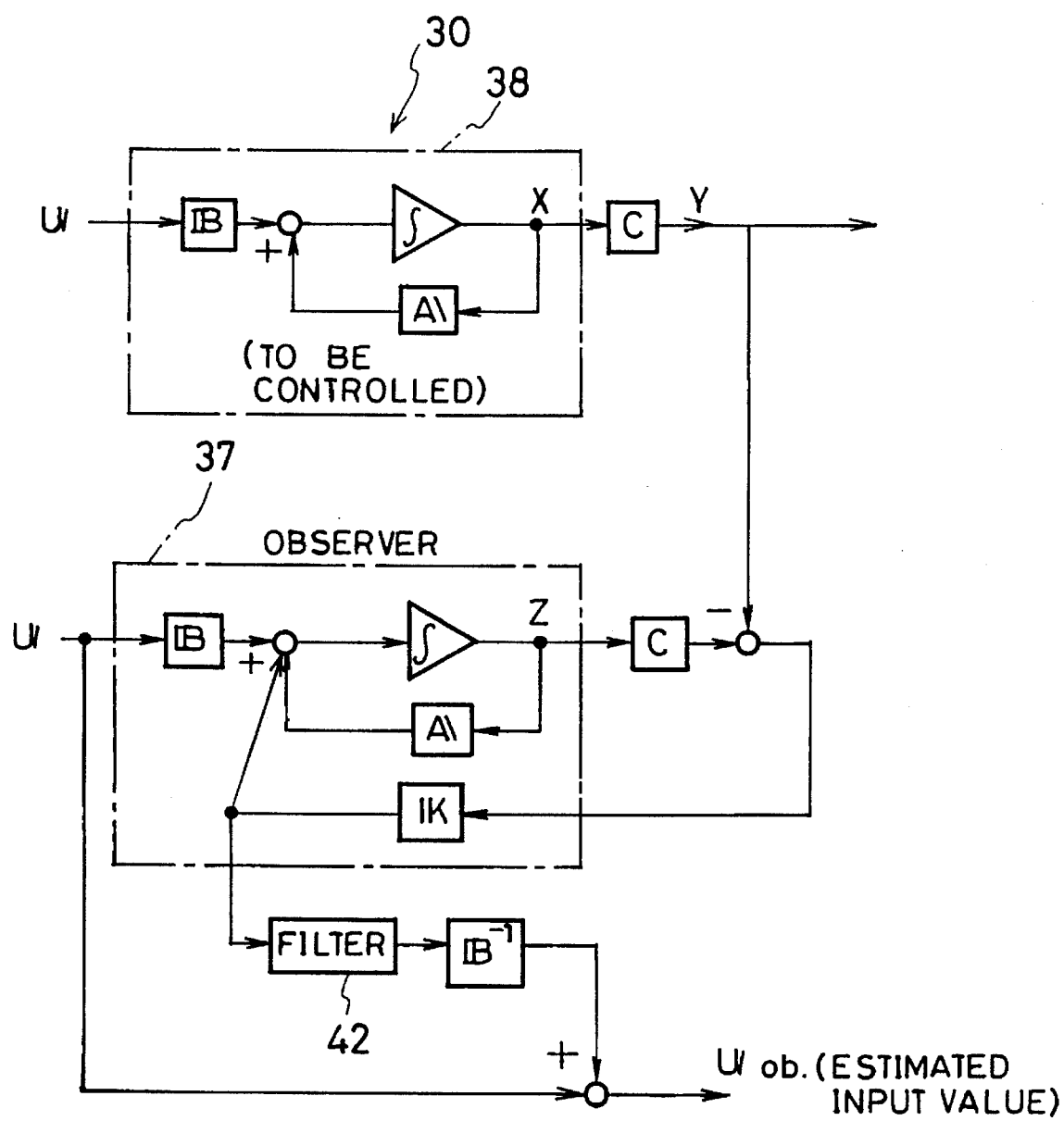
FIG. 4 is a diagram of the configuration of the observer of the first aspect of the present invention.

FIG. 4 is a control block diagram showing part of the control unit 30 of FIG. 1 and the observer 37. Reference codes in this control block diagram are represented by a general notation for system control and their descriptions are omitted. In FIG. 4, 38 represents one of the systems to be controlled for controlling the air-conditioner. For instance, the system controls the opening of the air mix door 16 for controlling an outlet air temperature. The observer 37 is an estimation model for estimating an amount of solar radiation to he used as a function of a predetermined system 38 to be controlled. The principle of the observer is described with reference to the following expression 4.

What is controlled is represented by the expression 4 which is developed as follows.

$$\begin{pmatrix} X = AX + Bu \\ y = CX \end{pmatrix} \quad \text{[expression 4]}$$

The observer is represented by Z=AZ+Bu−K (CX−CZ). In this instance, $$Z = \begin{bmatrix} Tr - ob \\ Tb - ob \end{bmatrix}$$

wherein Tr–ob is an estimated value of inside temperature and Tb–ob is an estimated value of car body humidity. The difference between the actual system and the observer is X–Z=A (X–Z)+KC(X–Z)=(A+KC) (X–Z). When (X–Z) is the difference ε, it is represented by ε=(A+KC) ε. When K is selected so that (A+KC) becomes a desired value, ε→0 (t→∞).

A description is subsequently given of a method for obtaining an estimated value in place of an output from a sensor not in use. Supposing that an error between the actual system (to be controlled) 38 and the observer 37 is based on a specific input error, a feed-back value of the observer 37 shows the effect of the input error. Therefore, a correction term is represented by the following expression 5.

$$W = KC(X-Z) = K(y-CZ) \quad \text{[expression 5]}$$

Therefore, when an estimated value of outside temperature of the actual system is to be corrected, the following expression 6 is obtained.

$$Ta\_ob = Ta\_old + \frac{K(y - CZ)}{\frac{\delta}{Mb}} \quad \text{[expression 6]}$$
(initial estimated value)

As in the above expression 6, an estimated value of outside temperature can be corrected.

Figure 5:
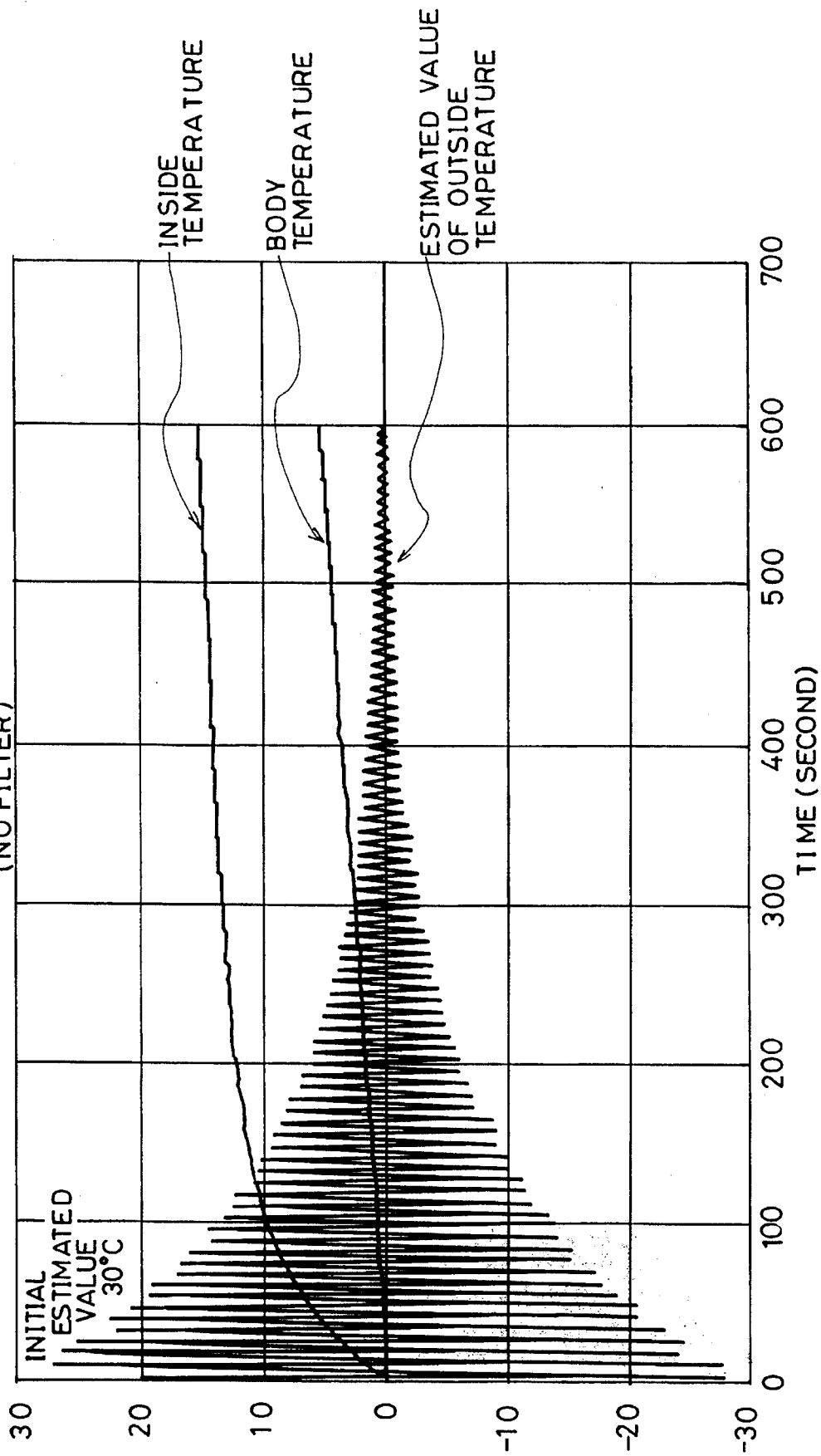
FIG. 5 is a diagram showing convergence when the observer has no feed-back circuit.

As for the method for estimating an outside temperature, estimated values obtained by the method of JP-A-5-116532 and other estimation method disclosed by the Applicant are used. A description of this method is omitted. A description is subsequently given of the necessity of a low-pass filter 42 shown in FIG. 4. FIG. 5 is a diagram showing a value of the expression 5, a correction term in the case that the low-pass filter 42 is not provided. An estimated value of outside temperature is converged to 0° while vibrating at a high frequency. The correction term undergoes many changes to correct estimated values quickly and estimated values fluctuate as shown in FIG. 5 when the correction term is not changed.

Figure 6:
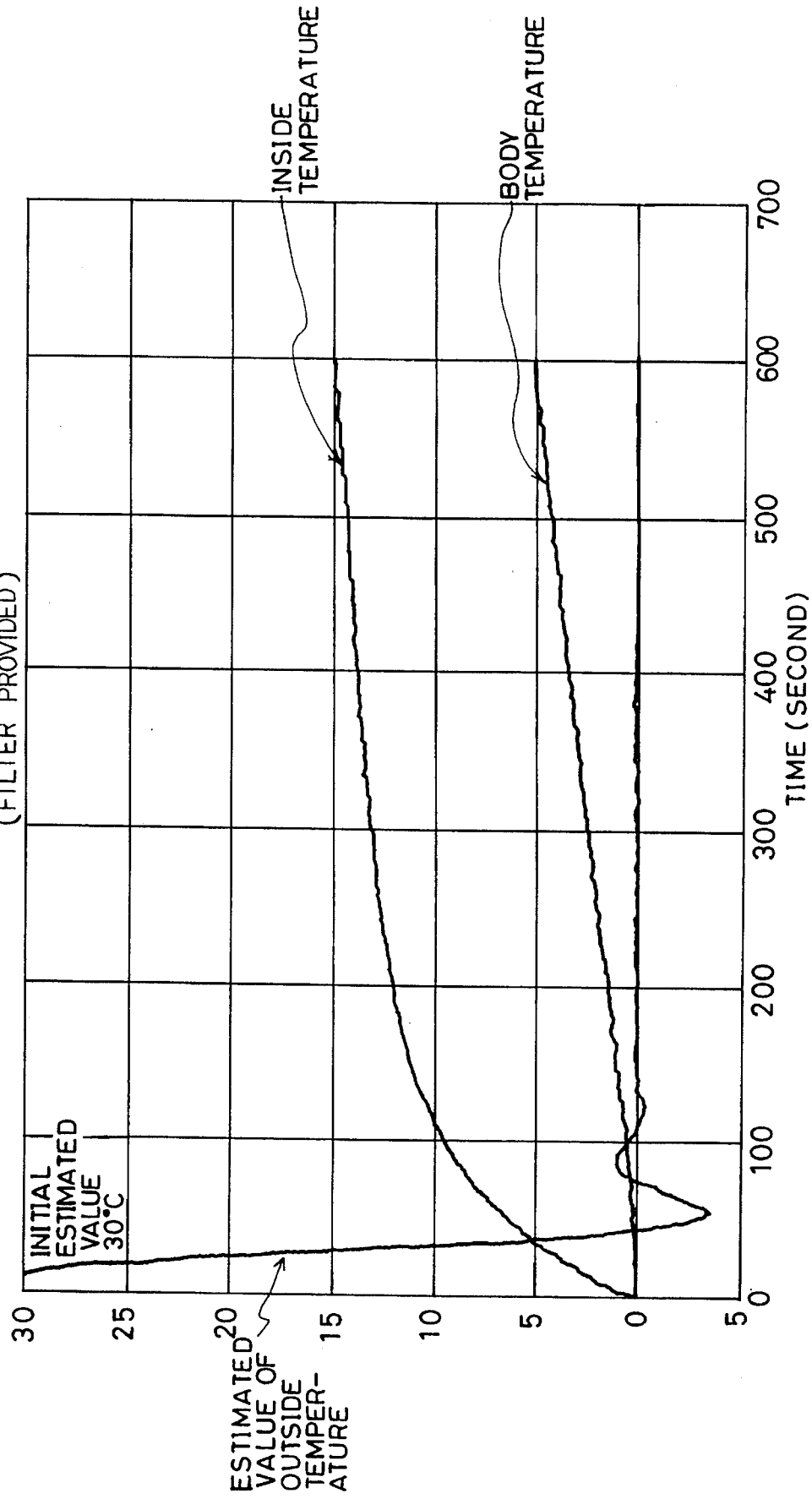
FIG. 6 is a diagram showing the stability of convergence when the observer has a feed-back circuit in FIG. 5 of the present invention.

Therefore, the expression 5 as a correction term can converge estimated values so that low-frequency elements are stabilized as shown in FIG. 6 by removing a variable (high-frequency) element with the low-pass filter 42. Consequently, even when the air sensor or the solar radiation sensor is omitted, air-conditioning control can be suitably carried out.

A second aspect of the invention will be described hereinunder. The second embodiment is a method for estimating an outside temperature and an amount of solar radiation with higher accuracy without using these detection sensors. A heat balance calculating model for each environmental factor is represented by the following expression 7.

$$Mr \frac{dTr}{dt} = Vu(Tu - Tr) + V1(T1 - Tr) - \beta1(Tr\_u - Tb) + Qsunr \quad \text{[expression 7]}$$

$$Mb \frac{dTb}{dt} = \beta1 Tr - \delta1 Tb + \delta1 Tamb + Qsunb$$

when this is converted by matrix representation, X=[Tr Tb]'
U=[Tu T1 Tamb Qsunr Qsunb]', Qsunr=Qsun×q1,
Qsunb=Qsun×q2,
X=AX+Bu,
wherein $$A = \begin{bmatrix} -\frac{Vu+V1-b1}{Mr} & \frac{\beta1}{Mr} \\ \frac{\beta1}{Mb} & -\frac{\delta1}{Mb} \end{bmatrix}$$

$$B = \begin{bmatrix} \frac{Vu}{Mr} & \frac{V1}{Mr} & 0 & 1 & 0 \\ 0 & 0 & \frac{\delta1}{Mb} & 0 & 1 \end{bmatrix}$$

Figure 7:
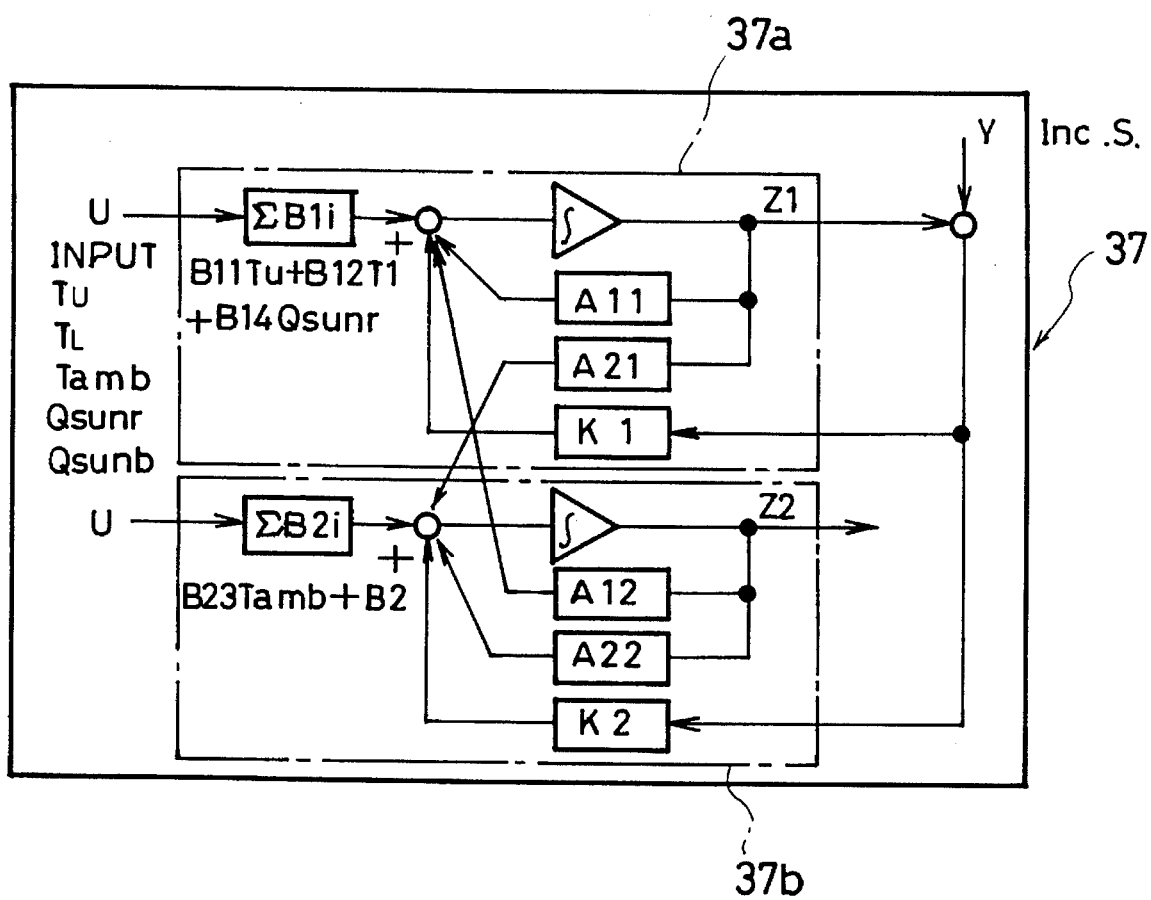
FIG. 7 is a diagram showing the general configuration of the observer.

According to a first embodiment of the second aspect of the invention, observers 37a and 37b corresponding to two environmental factors are provided in the observer 37 of FIG. 1 as shown in FIG. 7. In this instance, the observer 37a estimates an inside temperature and the observer 37b estimates a car body temperature. To estimate an outside temperature and an amount of solar radiation simultaneously, the expression of the observer becomes the following expression 8.

$$Z1 = A11Z1 + A12Z2 + \Sigma B1iUi + K1(Y-X1)$$

$$Z2 = A21Z1 + A22Z2 + \Sigma B2iUi + K2(Y-X1) \quad \text{[expression 8]}$$

wherein Z1 is an estimated value of inside temperature, Z2 is an estimated value of car body temperature, X1=Tr, X2=Tb and Y=Tinc.s.

Vu is an amount of an upper air flow coming from the defrost air outlet 18 and the vent air outlet 19, and V1 is an amount of a lower air flow from the floor air outlet 20. Tu is an estimated value of upper air outlet temperature and T1 is an estimated value of lower air outlet temperature.

As for reference codes having the same meanings, but expressively different from the reference codes of the expressions 1 and 2 of the first aspect of the invention, Qsunr=Q1, an estimated value of the amount of solar radiation to the inside of the vehicle, Qsunb=Q2, an estimated value of the amount of solar radiation to a car body. Q1 and q2 are predetermined parameters. As described above, Tr is an estimated value of inside temperature, Tb an estimated value of car body temperature and Tamb an estimated value of outside temperature.

Figure 8:
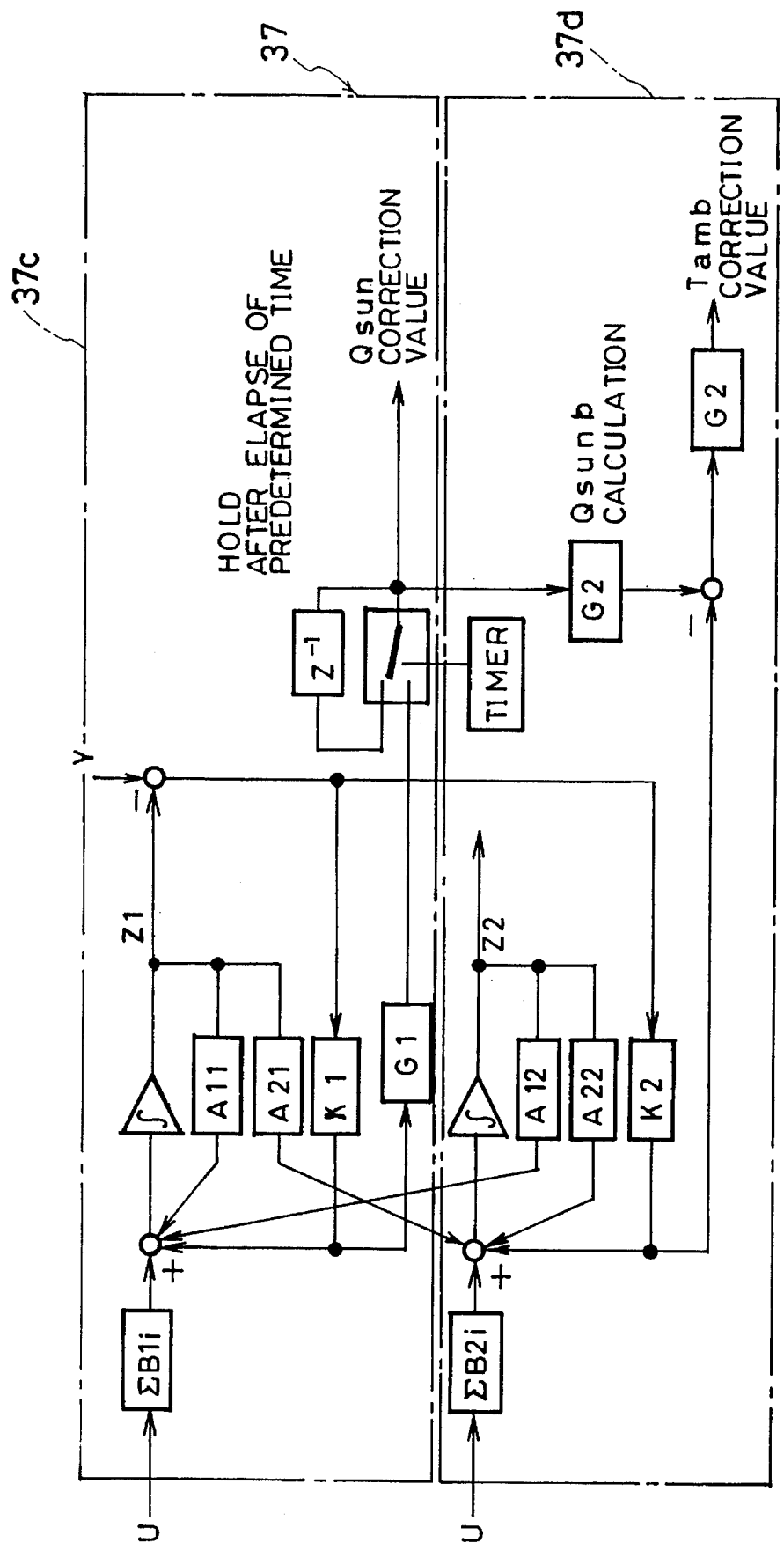
FIG. 8 is a diagram showing the configuration of the observer according to a second aspect of the present invention.

Further, according to a second embodiment of the second aspect of the invention, the observer 37 of FIG. 1 consists of observers 37c and 37d corresponding to two environmental factors as shown in FIG. 8. In this instance, the observer 37c adds a correction value to an estimated value of inside temperature and the observer 37d adds a correction value to an estimated value of car body temperature. Error expressions in the configuration of FIGS and 9 are the following expression 9.

$$X1 - Z1 = A11(X1-Z1) + A12(X2-Z2) - K1(Y-Z1)$$

$$X2 - Z2 = A21(X1-Z1) + A22(X2-Z2) - K2(Y-Z1) \quad \text{[expression 9]}$$

When the difference between an inside temperature and an estimated value of inside temperature is represented by e1=X1−Z1, and the difference between a car body temperature and an estimated value of car body temperature is represented by e2=X2−Z2, e1=(A121−K1)e1+A12e2, and e2=(A21−K2)e1+A22e2.

In matrix representation, e−A' e wherein $$A' = \begin{bmatrix} -\frac{Vu+V1-\beta1}{Mr} - K1 & \frac{\beta1}{Mr} \\ \frac{\beta1}{Mb} - K2 & -\frac{\delta1}{Mb} \end{bmatrix}$$

When K1 and K2 are selected so that A' becomes stable, e→0 at t→∞.

Thereafter, an outside temperature and an amount of solar radiation are estimated. Suppose that an error factor between the model and the actual temperature is based on errors in the estimated values of outside temperature and the amount of solar radiation. Therefore, it can be assumed that correction amounts made by the observer are correction amounts to be made on estimated values of outside temperature and the amount of solar radiation. In this instance, a correction amount for Z1, an estimated value of inside temperature, is a correction amount to be made on the amount of solar radiation and a correction amount for Z2, an estimated value of car body temperature, is a correction amount to be made on outside temperature and the amount of solar radiation (obvious from the constitution of the model). However, the effects of outside temperature and solar radiation cannot be separated. Then, when the effect of solar radiation on inside temperature is analyzed, it is divided into a fast response and a slow response.

It is understood from the model that the fast response is the effect of Qsunr, an estimated value of the amount of the solar radiation to the inside of the vehicle (a passenger feels hot soon after the sun shines into the inside of the vehicle) and the slow response is the effect of Qsunb, an estimated value of the amount of solar radiation to the car body heated slowly by solar radiation and outside air. Therefore, Qsunr, an amount of solar radiation to the inside of the vehicle, is determined from a correction amount for Tr (Z1), an inside temperature, in the former stage of response and Qsunb, an estimated value of radiation to the car body, is determined in the latter stage of response. An amount of solar radiation is determined from Qsunb, the determined amount of solar radiation to the car body, and Qsunr, the determined amount of solar radiation to the inside of the vehicle. Thereafter, when Tamb (outside temperature) is estimated, both an outside temperature and an amount of solar radiation can be estimated.

This embodiment is described in detail hereinunder with reference to FIG. 8 and expressions. Tr, an actual inside temperature and Tb, an actual car body temperature can be obtained from the inside temperature detection sensor 32 and the car body temperature detection sensor 40 as X1 and X2, respectively. The expression 7 is used to obtain Z1, an estimated value of inside temperature, and Z2, an estimated value of car body temperature, using the observer 37 of FIG. 7. A relational expression, Z1, an estimated value of inside temperature, has a functional relationship with F (Q, estimated value of amount of solar radiation) according to the expression 8. Further, Z2, an estimated value of car body temperature has a functional relationship with G (Q, Tamb, estimated value of outside temperature).

In this instance, Q (estimated value of amount of solar radiation)=Q1 (estimated value of amount of solar radiation to the inside of the vehicle)+Q2 (estimated value of amount of solar radiation to the car body). Further, it is desired from the expression 9 that the difference between an actual value and an estimated value is "0", but is assumed to be increased by errors in the estimated values of the expression. As the result, expressions 10 and 11 are established. Since estimated values, Tamb, Q1 and Q2, can be calculated from the expressions 3, 4, 5 and 5 of JP-A-5-346259 applied by the Applicant, these descriptions are omitted here.

$$X1-Z1=\Delta F(Q) \quad \text{[expression 10]}$$

$$X2-Z2=\Delta G(Q, Tamb) \quad \text{[expression 11]}$$

Qh, a highly accurate estimated value, can be obtained from the above expression 10 when a newly estimated value of the amount of solar radiation is obtained from [Q+(X1−Z1)]=Qh. Next, Qh, the estimated value of the amount of solar radiation, includes Q1, an estimated value of the amount of direct solar radiation, and Q2, an estimated value of the amount of solar radiation to the car body. These two values are first separated.

Figure 9:
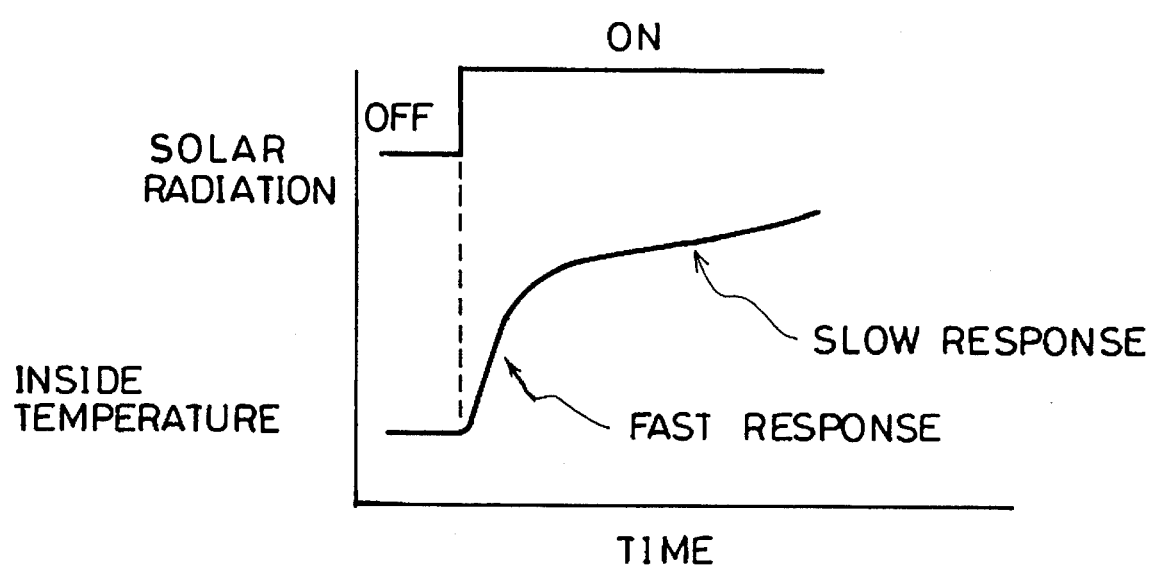
FIG. 9 is a diagram of temperature variations for explaining the second aspect of the present invention.

In FIG. 9, since a response to a fast rise in temperature greatly affects Qsunr, an actual amount of direct solar radiation, Q1h, a highly accurate estimated value of the amount of direct solar radiation (to the inside of the vehicle) is represented by the following expression 12 according to (X1−Z1)t0=ΔF(Q1)t0 at a time t0 defined as the beginning with the observer 37 of FIG. 8. Q, an estimated value of the amount of solar radiation at a time t1, is based on Q2, an estimated value of the amount of solar radiation to the car body, and Q1, an estimated value of the amount of direct solar radiation, is extremely small and may be considered to be null.

$$Q1h=[Q1+(X1-Z1)t0] \quad \text{[expression 12]}$$

Therefore, like the expression 12, t1 is defined by the observer 37 of FIG. 8 as a time when the car body is fully warmed up, and Q2h, a highly accurate estimated value of the amount of solar radiation to the car body, is represented by the following expression 13 according to (X1−Z1)t1= ΔF(Q2)t1.

$$Q2h=[Q2+(X1-Z1)t1] \quad \text{[expression 13]}$$

Therefore, Qhh, a highly accurate estimated value of the total amount of solar radiation, is represented by the following expression 14 from the sum of the expressions 12 and 13.

$$Qhh=Q1h+Q2h=[Q1+Q2+(X1-Z1)t0+(X1-Z1)t1] \quad \text{[expression 14]}$$

The expression 15 can be obtained from the above expressions 14 and 11. As a consequence, Tambh, a highly accurate estimated value of Tamb, an estimated value of outside temperature, is represented by the following expression 16.

$$(X2-Z2)=\Delta G([Q1+Q2(X1+Z1)t0+(X1-Z1)t1], Tamb) \quad \text{[expression 15]}$$

$$Tambh=Tamb+(X2-Z2)=Tamb+\Delta G([Q1+Q2+(X1-Z1)t0+(X1-Z1)t1], Tamb) \quad \text{[expression 16]}$$

A more highly accurate estimated value of outside temperature can be obtained from the above expression 16.

Figure 10:
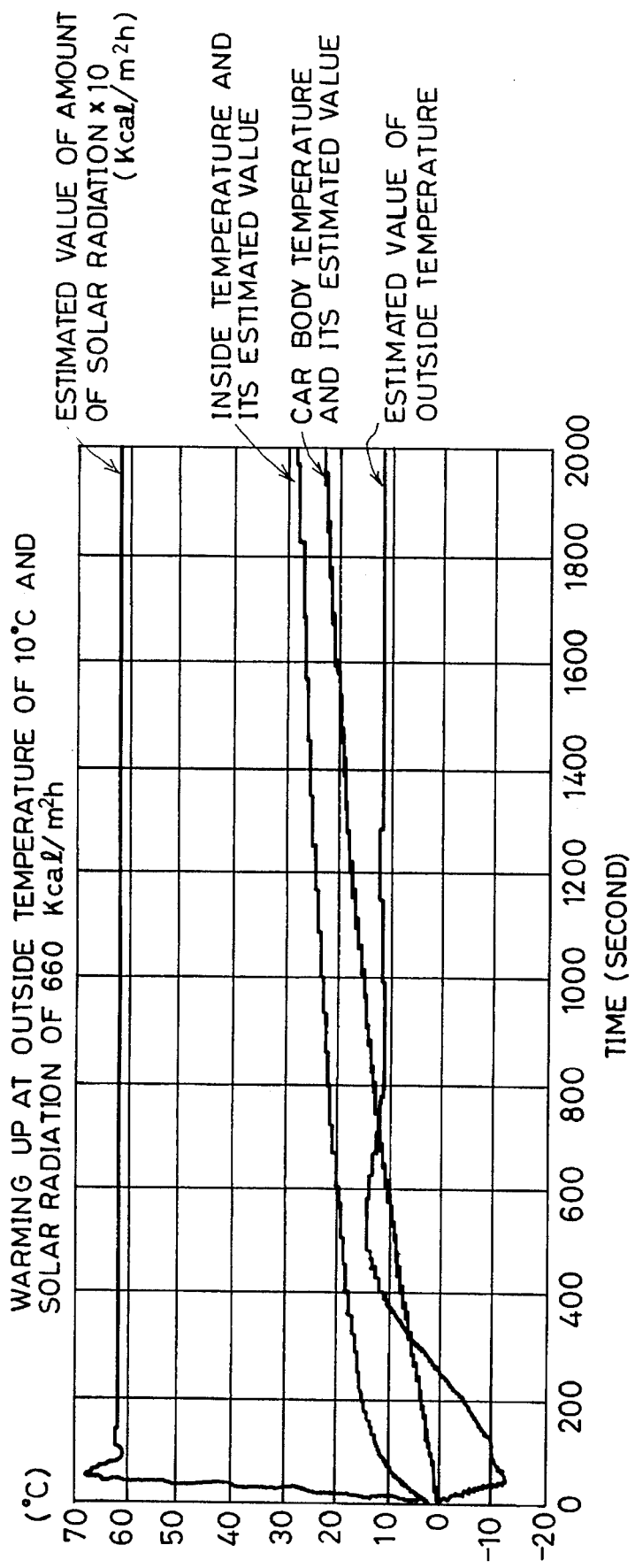
FIG. 10 is a diagram showing simulation results according to the second aspect of the present invention.
Figure 11:
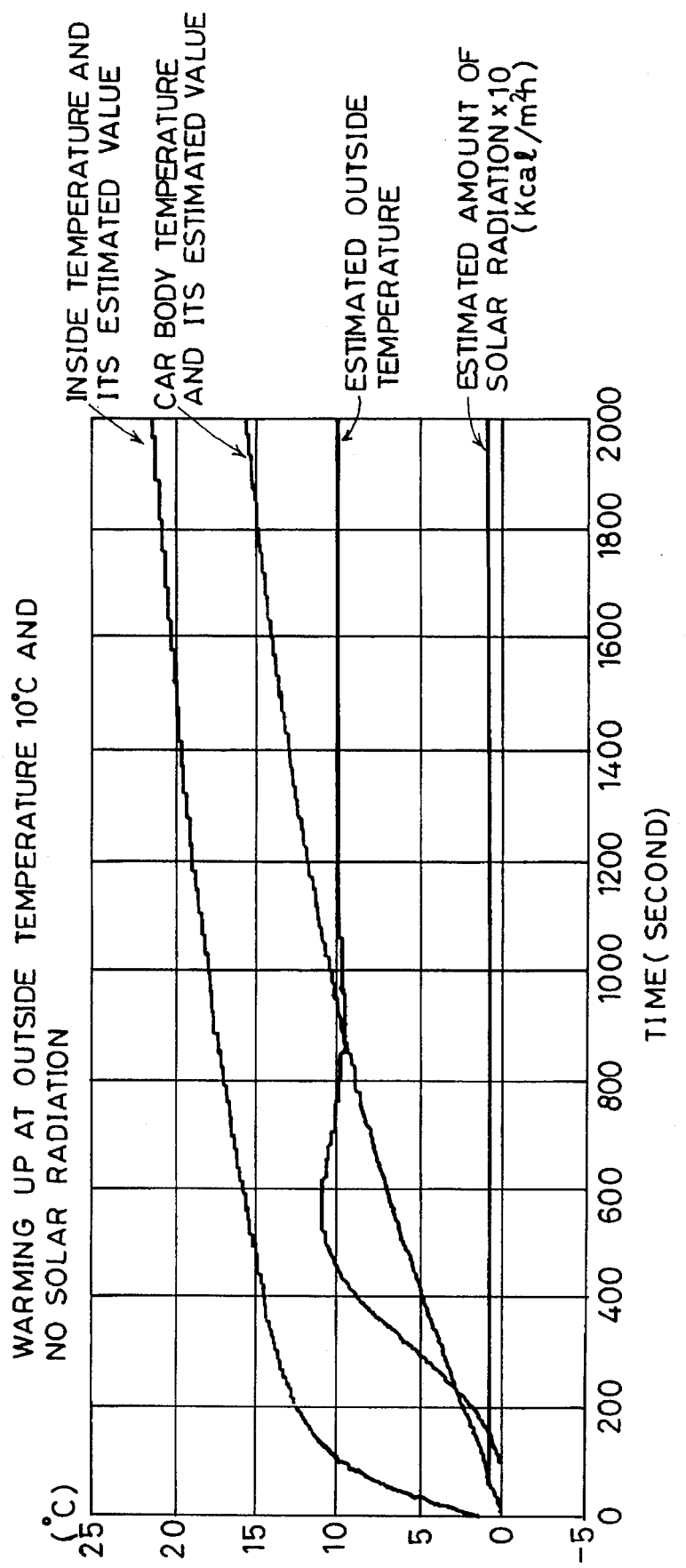
FIG. 11 is a diagram showing other simulation results according to the second aspect of the present invention.

FIG. 10 and FIG. 11 are diagrams showing simulation results obtained by using a computer. FIG. 10 shows simulation results obtained when a vehicle is warmed up at an outside temperature of 10° C. and a solar radiation of 660 kcal/m²h. The results indicate that an estimated value of outside temperature has an error of +1° C. and is close to an actual outside temperature of 10° C. and that an estimated amount of solar radiation has an error of −50 kcal/m²h and is close to an actual solar radiation amount of 660 kcal/m²h.

FIG. 11 shows simulation results obtained when a vehicle is warmed up at an outside temperature of 10° C. without solar radiation. It is understood that an estimated value of outside temperature has an error of almost ±0° C. and is the actual outside temperature of 10° C. and that an estimated amount of solar radiation has an error of +8 kcal/m²h and is highly accurate.

As a consequence, an inside temperature can be estimated from a heat balance model similar to one described above with high accuracy without using the outside temperature detection sensor, the solar radiation sensor and the like as inputs and the same control status as that of normal control can be continued.

Figure 12:
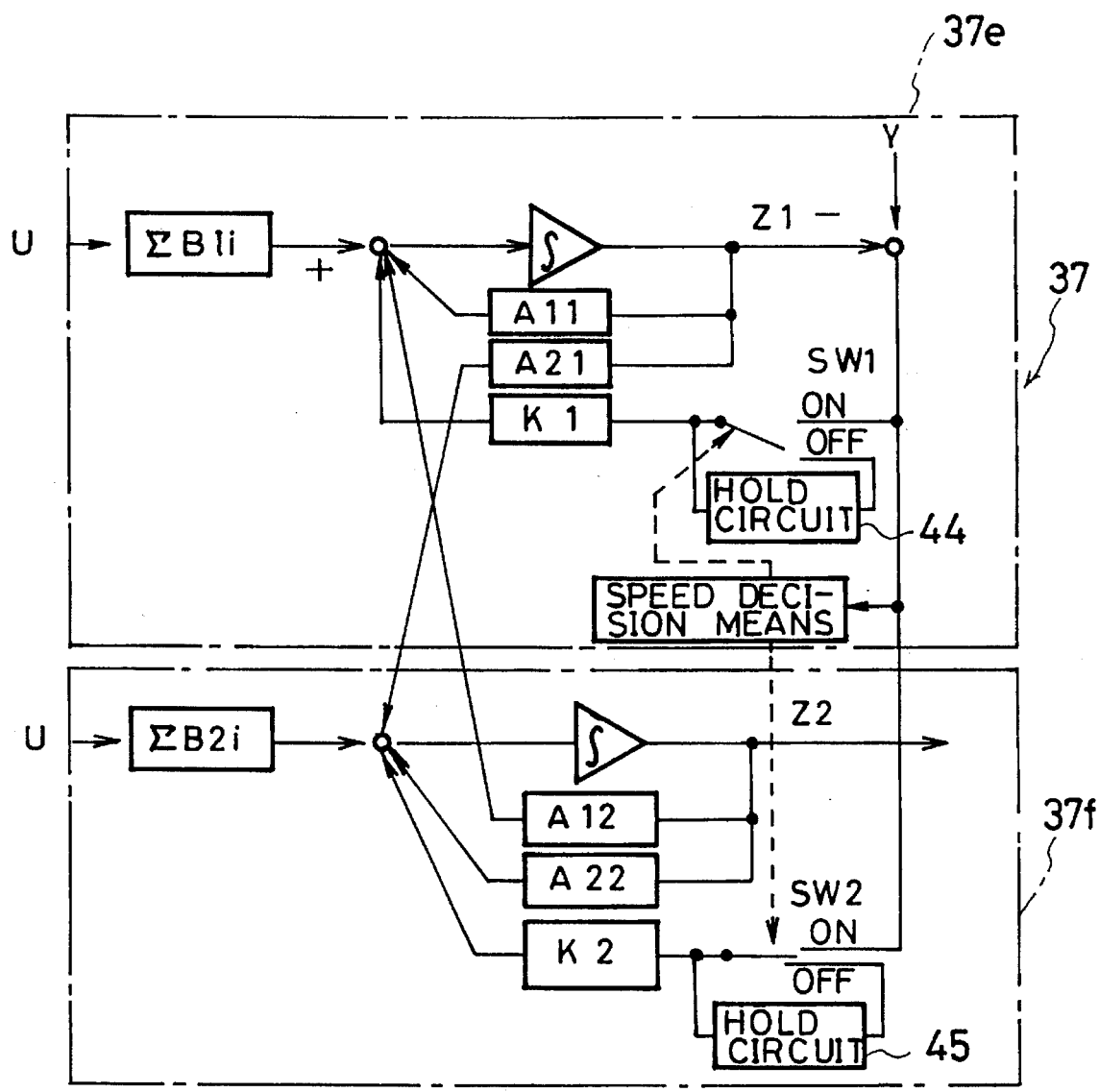
FIG. 12 is a diagram showing the configuration of other observer according to the second aspect of the present invention.

Further. FIG. 12 shows another embodiment of the second aspect of the invention. In this embodiment, observers 37e and 37f are provided in place of the two observers of FIG. 8. Speed decision means 34 for detecting a change in speed (Y−Z1) is provided on the output side of Z1 and input switches SW1 and SW2 are provided on the input sides of feed-back constants K1 and K2, respectively. These input switches SW1 and SW2 receive a signal Y when they are turned on and receive the previous signal Y from hold circuits 44 and 45, respectively, when they are turned off. The switch SW1 is turned on by a detection signal from the speed decision means 34, but the switch SW2 is turned off by the signal.

When the change in speed (Y−Z1) is faster than a preset value, the speed decision means 34 outputs a detection signal. As the result, the switch SW1 is turned on and the observer 37e adds Y·K1, a feed-back value, to the current value of Y and the observer 37f adds Y·K2, a feed-back value, to the previous value of Y. When the change in speed (Y−Z1) is slower than the preset value, the speed decision means 34 does not output a detection signal (drive signal). As the result, the observer 37e undergoes conversely addition of Y−K1, a feed-back amount, by the previous value of Y and the observer 37f undergoes addition of Y·K2, a feedback amount, by the current value of Y.

Therefore, it is possible to make accurate estimation in response to a change in Z1, an estimated value of inside temperature. Each correction term (value) of the second aspect of the invention can he stably obtained by adapting provision of the low-pass filter of the first aspect of the invention to the second aspect of the invention.

As described on the foregoing pages, according to the invention, even when a specific detection sensor is not used (provided) as an input, the size of an environmental factor corresponding to the omitted detection sensor is estimated based on a heat balance calculation model and a highly accurate correction term can be added to the estimated value. Therefore, a control status very close to that of normal air-conditioning control achieved when the detection sensor is used as an input can be continued. Further, since an estimated value is converged in a stable direction, control at a transit period is made stable. An air-conditioner can he used without providing an unpleasant feeling upon shift from a detection sensor to an estimated value.

What is claimed is:

1. In an air-conditioner for use in a vehicle which is equipped with a control unit which receives a detected or estimated value pertaining to a heating value supplied from the air-conditioner to the inside of the vehicle and detected or estimated values pertaining to environmental factors which affect the heating value of the inside of the vehicle other than those of the air-conditioner as inputs and estimates an inside temperature using a heat balance calculation model which uses these detected or estimated values as parameters and with a detection sensor for detecting a temperature of the inside of the vehicle and which constitutes an observer by multiplying the difference between a detected value from the detection sensor and an estimated value obtained from the calculation model by a predetermined gain and by feeding back the obtained value, an air-conditioning control method for a vehicle characterized in that a correction term is created based on the feed-back value to correct the detected value or estimated value used as a parameter.

2. The air-conditioning control method for a vehicle according to claim 1, wherein the environmental factor is an outside temperature which is calculated from the heat balance calculation model based on a heat balance calculation expression for an environmental factor contributing to variations in inside temperature and a heat balance calculation expression for an environmental factor contributing to variations in car body temperature.

3. The air-conditioning control method for a vehicle according to claim 1, wherein the estimated outside temperature is obtained from a low-pass filter as the estimated value.

4. The air-conditioning control method for a vehicle according to claim 1, wherein the environmental factor is an amount of solar radiation which is estimated from the heat balance calculation model based on a heat balance calculation expression for an environmental factor contributing to variations in inside temperature and a heat balance calculation expression for an environmental factor contributing to variations in car body temperature.

5. The air-conditioning control method for a vehicle according to claim 1, wherein the estimated value is an amount of solar radiation and the correction term uses as a parameter the difference between an output value from the inside temperature detection sensor for detecting a temperature of the inside of the vehicle and an estimated value of inside temperature.

6. The air-conditioning control method for a vehicle according to claim 5, wherein the correction term for an amount of solar radiation uses as a parameter an output value detected by the detection sensor in the former stage of a change in inside temperature.

7. The air-conditioning control method for a vehicle according to claim 4, wherein the estimated value is an outside temperature and the correction term uses as a parameter the difference between an output value from the inside temperature detection sensor for detecting a temperature of the inside of the vehicle and an estimated value of inside temperature.

8. The air-conditioning control method for a vehicle according to claim 1, wherein the estimated value is an outside temperature and the correction term can be obtained by using an amount of solar radiation which is an output value detected by the detection sensor in the former stage of a change in inside temperature, the difference between an output value detected by the inside temperature detection sensor in the former stage of a change in inside temperature and an estimated value of inside temperature, and the difference between an output value detected by the inside temperature detection sensor in the latter stage and the estimated value of inside temperature.

* * * * *